United States Patent
Zimlin et al.

(10) Patent No.: US 7,145,770 B1
(45) Date of Patent: Dec. 5, 2006

(54) METHOD AND APPARATUS OF PACKAGING DISK DRIVES IN A DATA STORAGE SYSTEM

(75) Inventors: Steven E. Zimlin, Boulder, CO (US); Keith W. Kirkwood, Bainbridge Island, WA (US); Macen Kanemi Shinsato, Renton, WA (US); Izaak Matthew Koller, Seattle, WA (US)

(73) Assignee: Copan Systems, Inc., Longmont, CO (US)

( * ) Notice: Subject to any disclaimer, the term of this patent is extended or adjusted under 35 U.S.C. 154(b) by 0 days.

(21) Appl. No.: 10/680,406

(22) Filed: Oct. 8, 2003

(51) Int. Cl.
*G06F 1/16* (2006.01)

(52) U.S. Cl. .................... 361/685; 361/724; 312/223.2

(58) Field of Classification Search ........ 361/683–692, 361/724–726; 312/223.1, 223.2, 236, 333
See application file for complete search history.

(56) References Cited

U.S. PATENT DOCUMENTS

| | | | | |
|---|---|---|---|---|
| 5,339,219 A * | 8/1994 | Urich | .......................... | 361/760 |
| 5,506,750 A * | 4/1996 | Carteau et al. | .............. | 361/685 |
| 5,822,184 A * | 10/1998 | Rabinovitz | ................... | 361/685 |
| 6,392,892 B1 * | 5/2002 | Sobolewski et al. | ......... | 361/724 |
| 6,618,249 B1 * | 9/2003 | Fairchild | ...................... | 361/687 |
| 6,621,693 B1 * | 9/2003 | Potter et al. | ................. | 361/685 |
| 6,653,802 B1 * | 11/2003 | Nelson et al. | ............... | 315/291 |
| 2002/0050771 A1 * | 5/2002 | Krispin et al. | ............ | 312/223.2 |

* cited by examiner

Primary Examiner—Anatoly Vortman
Assistant Examiner—Anthony Q. Edwards
(74) Attorney, Agent, or Firm—Trellis Intellectual Property Law Group, PC

(57) ABSTRACT

A high density storage device packaging apparatus in which storage devices are oriented to have lateral faces parallel to each other and to edges of a module in which the storage devices are mounted. The storage devices are connected to a board contained in the module by a plug-in action. The board contains a controller to control the operation of the storage devices including the READ and WRITE operations. The RSM is capable of holding a large number of storage devices and capable of being inserted into a cabinet by a plug-in connection. The RSM includes a housing that covers and protects the storage devices and includes air channels to allow the storage devices to cool. The invention provides a solution for high density packaging of the storage devices and allows for easy access to the storage devices and allows for replacement of failed storage devices without disruption of the remainder of storage devices in the RSM or in the cabinet.

33 Claims, 5 Drawing Sheets

METHOD AND APPARATUS OF PACKAGING DISK DRIVES IN A DATA STORAGE SYSTEM

The present invention relates to the method and apparatus for packaging a plurality of disk drives for use in a data storage system. The present invention describes a technique for optimum packaging of a large number of disk drives to obtain the highest density of storage with maximum reliability and serviceability.

BACKGROUND OF THE INVENTION

A typical disk drive is a commercially available hard disk drive of any capacity and transfer rate that fit in a 3½ inch form factor. It is a common practice to utilize multiple hard disk drives in a storage system to attain high storage capacities. Current designs of storage systems have either packaged individual disk drives or mounted disk drives in an array or drawer. Packaging is generally understood to provide mechanical mounting and electrical interconnection for the disk drives. Packaging may also provide physical protection and a control function for each drive.

The prior art packaging techniques have failed to achieve a very high density of disk drive packaging technique that is both cost-effective and easily serviceable by a technician. The typical prior art techniques are too bulky to be considered for many applications. The typical prior art techniques are also difficult to service, causing excessive down time for the storage system during required servicing times, such as when a disk drive fails. The excessive down time degrades the usefulness of the storage system to the operator and may cause a great inconvenience to operators who desire to access the disk data in the storage system.

SUMMARY OF THE INVENTION

The arrangement of the present invention enables maximizing the number of disk drives that can be effectively used in a rack or cabinet configuration. The technique of the present invention is extendable in both vertical and horizontal directions to optimize packing density of disk drives at a higher volume level. The present invention allows a user to save floor space while obtaining a high volume storage system. The present invention eliminates the need for a technician to individually connect or wire each disk drive and also enables easy and convenient serviceability of the disk drives 4. The present invention allows replacement of individual failed disk drives without disturbing the other disk drives in the storage system or the removable and serviceable storage module (RSM) and hence, without impacting the security of the majority of the data contained in the storage system.

A storage device of the present invention may comprise: a cabinet capable of holding a plurality of RSM that is capable of containing a plurality of storage device or disk drives, the cabinet having a docking port being configured to electrically connect to the RSMs; each RSM of the plurality of RSMs may include: a board having a plurality of ports, each port of the plurality of ports being capable of electrically connecting to a storage device, and the plurality of ports being arranged in rows so that a plurality of storage devices are arranged in rows with a lateral surface facing parallel to a lateral edge of the board when said plurality of storage devices are connected to said board.

In the storage device of the present invention each RSM may further include a side housing member having raised portions and lowered portions, the raised portions providing a channel to allow airflow through the RSM.

In the storage device of the present invention each RSM may further include a top housing member having lateral raised portions and lateral lowered portions, the lateral raised portions providing a channel to allow airflow through the RSM.

In the storage device of the present invention the top housing member may include a plurality of individually removable segments.

In the storage device of the present invention each RSM may further include a bottom housing portion having raised bottom portions and lowered bottom portions, the raised bottom portions providing a channel to allow placement of a controller to control storage devices attached to the board and to allow placement of power and control interconnections to the plurality of ports.

In the storage device of the present invention the board may further include an electrical connector capable of electrically connecting the RSM to said docking port in the cabinet.

In the storage device of the present invention the board may further include a latching mechanism capable of mechanically connecting said RSM to said docking port in said cabinet.

In the storage device of the present invention each RSM of said plurality of RSMs may be configured to be electrically disconnected and mechanically removed from a docking port within the cabinet by a single operation, and to allow a single disk drive of the plurality of disk drives to be removed without disturbing a connection of other disk drives connected to the board of the RSM.

A storage apparatus according to the present invention may comprise: a board having a plurality of ports, each port of the plurality of ports being capable of electrically connecting to a storage device, and the plurality of ports being arranged in rows so that a plurality of storage devices are arranged in rows with a lateral surface facing perpendicular to a lateral wall of the board and control connectors on the storage devices face and connect to a port when the plurality of devices are connected to the board; and a housing holding the board and configured to hold a plurality of devices in rows with a lateral surface of the storage devices facing perpendicular to a lateral wall of the board when said plurality of devices are connected to the board.

In the storage apparatus of the present invention, the board may further include an electrical connector capable of electrically connecting the storage apparatus to an external control device.

In the storage apparatus of the present invention, the board may further include a latching mechanism capable of mechanically connecting the storage apparatus to an external control device.

In the storage apparatus of the present invention, the storage apparatus is configured to be electrically disconnected and mechanically removed from a docking port within the cabinet by a single operation, and to allow a single disk drive of the plurality of disk drives to be removed without disturbing a connection of other disk drives connected to the board.

In the storage apparatus of the present invention, the said housing may be made of thermally conductive material.

A method of packaging storage devices having a control connector on an end surface of each storage device according to the present invention may comprising the steps of: A) orienting a first storage device so that an end having a first storage device control connector faces a board and a lateral surface of the first storage device is parallel to a first lateral edge of the board; B) pushing the first storage device on to the board so that the first storage device control connector becomes electrically connected to a first port on the board; C) orienting a second storage device so that an end having a second storage device control connector faces a board and a lateral surface of the second storage device is parallel to a second lateral edge of the board, and an opposite lateral surface of the second storage device is parallel to another lateral surface of said first storage device, the second lateral edge of the board being opposite to the first lateral edge of the board; and D) pushing the second storage device on to the board so that the second storage device control connector becomes electrically connected to a second port on the board.

In the method of packaging storage devices the board may have a plurality of ports arranged in rows, each port of the plurality of ports being capable of electrically connecting to a control connector, the method may further comprise the step of: repeating steps A through D until all of the plurality of ports are attached to a storage device.

In the method of packaging storage devices may further comprise the step of: covering the board, said first storage device and the second storage device with a housing, the housing having side housing member having raised portions and lowered portions, the raised portions providing a channel to allow airflow through the RSM.

In the method of packaging storage devices the housing may further include a bottom housing portion having raised bottom portions and lowered bottom portions, the raised bottom portions providing a channel to allow placement of a controller to control storage devices attached to the board and to allow placement of power and control interconnections to the plurality of ports.

In the method of packaging storage devices, the board may further include an electrical connector, and the method may further comprise the step of inserting the housing in a cabinet suited for holding a plurality of housings having a plurality of storage devices and electrically connecting the electrical connector to a docking port in the cabinet.

In the method of packaging storage devices, the board may further include a latching mechanism capable of mechanically connecting the storage apparatus to an external control device, and the method may further comprise the step of latching the latching mechanism to the docking port in the cabinet.

In the method of packaging storage devices, the steps of latching the latching mechanism and electrically connecting the electrical connector occur by the same action of an operator.

In the method of packaging storage devices, may further comprise the steps of unlatching the latching mechanism and disconnecting the electrical connector occur by the same action of an operator.

In the method of packaging storage devices, the action of pushing the first storage device in step B may electrically connect and mechanically connect the first storage device to the board in a single operation.

In the method of packaging storage devices, the action of pushing the second storage device in step D may electrically connect and mechanically connect the second storage device to the board in a single operation.

BRIEF DESCRIPTION OF THE DRAWINGS

The accompanying drawings, which are incorporated in and form a part of the specification, illustrate exemplary embodiments of the present invention and, together with the description, serve to explain the principles of the invention. In the drawings.

DETAILED DESCRIPTION OF THE INVENTION

Reference will now be made in detail to the present exemplary embodiments of the invention.

Figure 1:
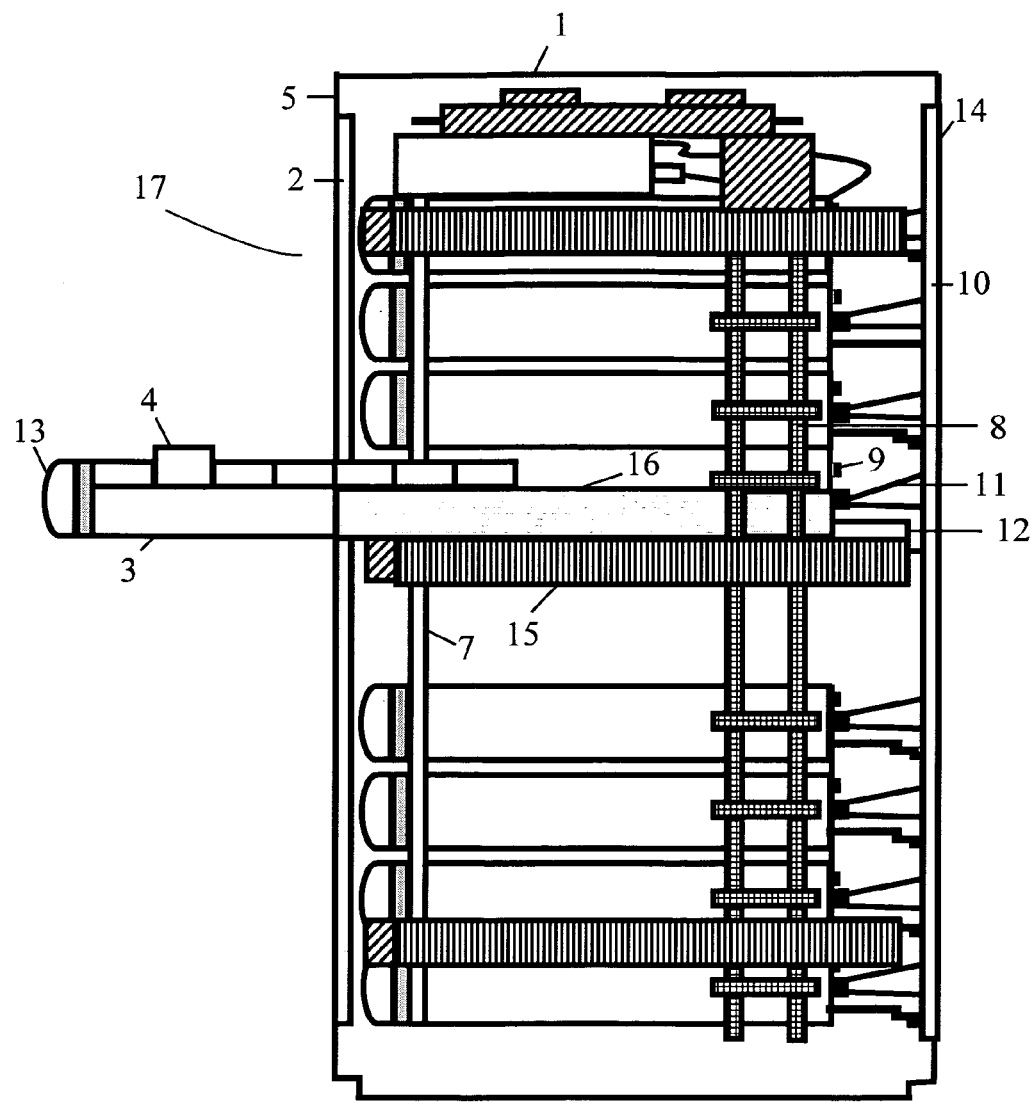
FIG. 1 illustrates a cut away view of a cabinet which may be used with the present invention.

FIG. 1 illustrates a side cut-away view of a storage cabinet 1 which holds a plurality of RSMs 3 having a plurality of disk drives 4 in a data storage system 17. The cabinet preferably has front door 2 which may allow access to and removal of a RSM 3 from the cabinet 1, as illustrated in FIG. 1. Cabinet 1 may contain a power supply 5 which provides power to the plurality of disk drives 4 through a power bus 8. Cabinet 1 may also contain a controller 7 which monitors the plurality of disk drives 4 and regulates access to the plurality of drives 4, such as regulating information READ requests and storage WRITE request. Cabinet 1 may also contain a plurality of docking ports 9 which provide an electrical connection to a RSM 3 to allow electrical power to be provided to RSM 3 and/or to allow READ and/or WRITE access to the disk drives 4 in RSM 3. The electrical connection may be in the form of a plug connection. The docking port 9 may contain a power switch 10 which may be switched ON or OFF to selectively provide electricity to a RSM 3 while engaged with docking port 9. Docking port 9 may be connected to power supply 5 and controller 7 via wires 11 and 12, respectively. Cabinet 1 may also preferably contain a rear door 14 to allow access to components in the rear part of cabinet 1, such as docking port 9, switch 10 and wires 11 and 12.

As illustrated in FIG. 1, RSM 3 may contain a handle 13. In a preferred embodiment, an operator may pull on handle 13 to slide RSM 3 horizontally along support 15 and out of a bay 16 within cabinet 1, after the RSM has been powered off. In a preferred embodiment, the electrical connection of RSM 3 to docking port 9 is disconnected as RSM 3 is pulled away from docking port 9. In a preferred embodiment, RSM 3 may be electrically disconnected and removed from cabinet 1 by a single pulling action. An operator may also remove and replace an individual disk drive 4 from RSM 3, as illustrated in FIG. 1.

The operator may reconnect RSM 3 to the data storage system by sliding RSM 3 along support 15 within bay 16 of cabinet 1 and connecting RSM 3 to docking port 9. In the preferred embodiment, RSM 3 is electrically connected to docking port 9 as RSM 3 is fully inserted in cabinet 1, such as by being plugged into docking port 9, while the RSM has been powered on. In a preferred embodiment, RSM 3 may be inserted in cabinet 1 and electrically connected to docking port 9 in a single operation.

Figure 2:
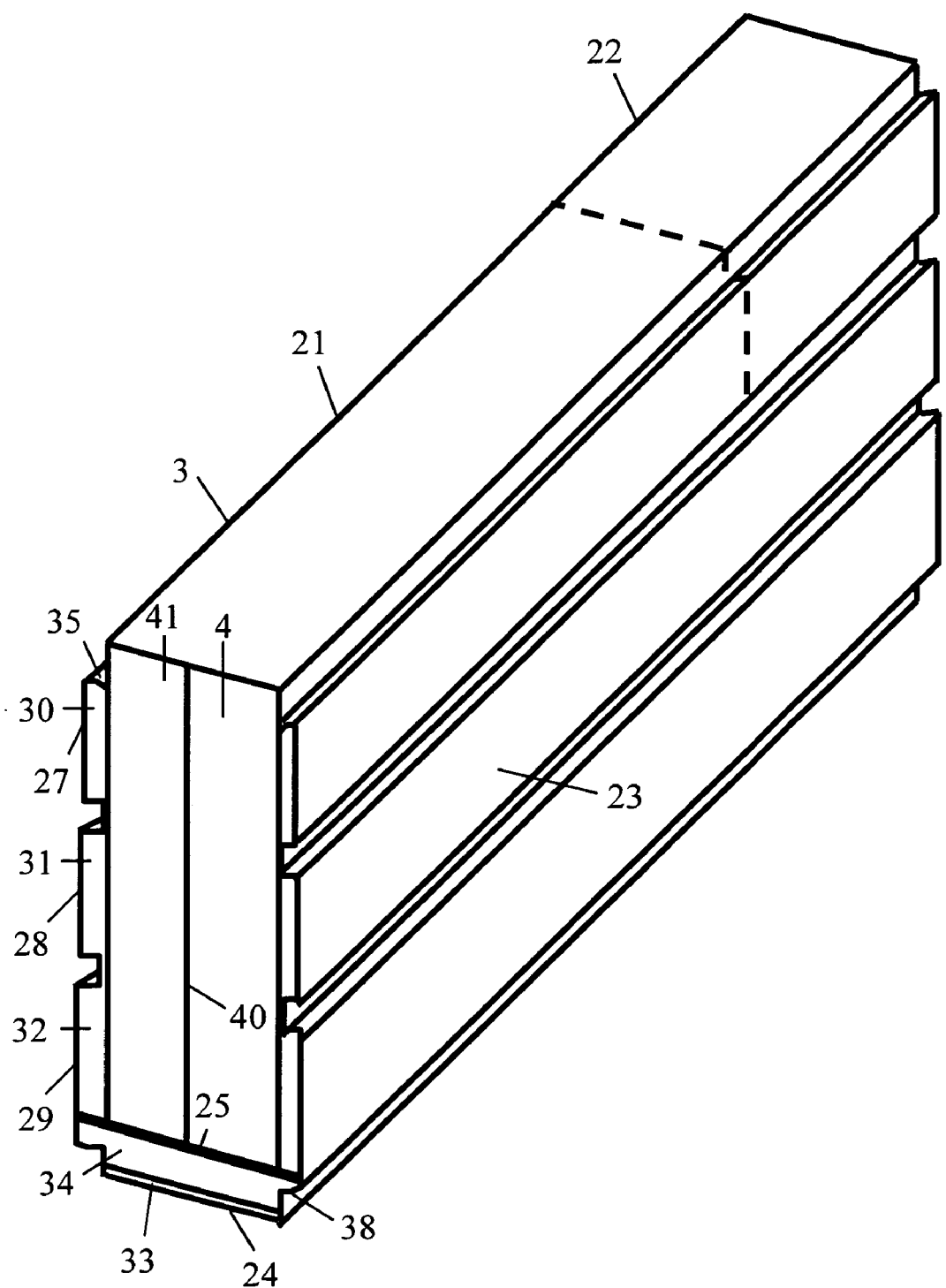
FIG. 2 illustrates a partial cut-away frontal view of a RSM containing a plurality of disk drives in accordance with a preferred embodiment of the present invention.
Figure 3:
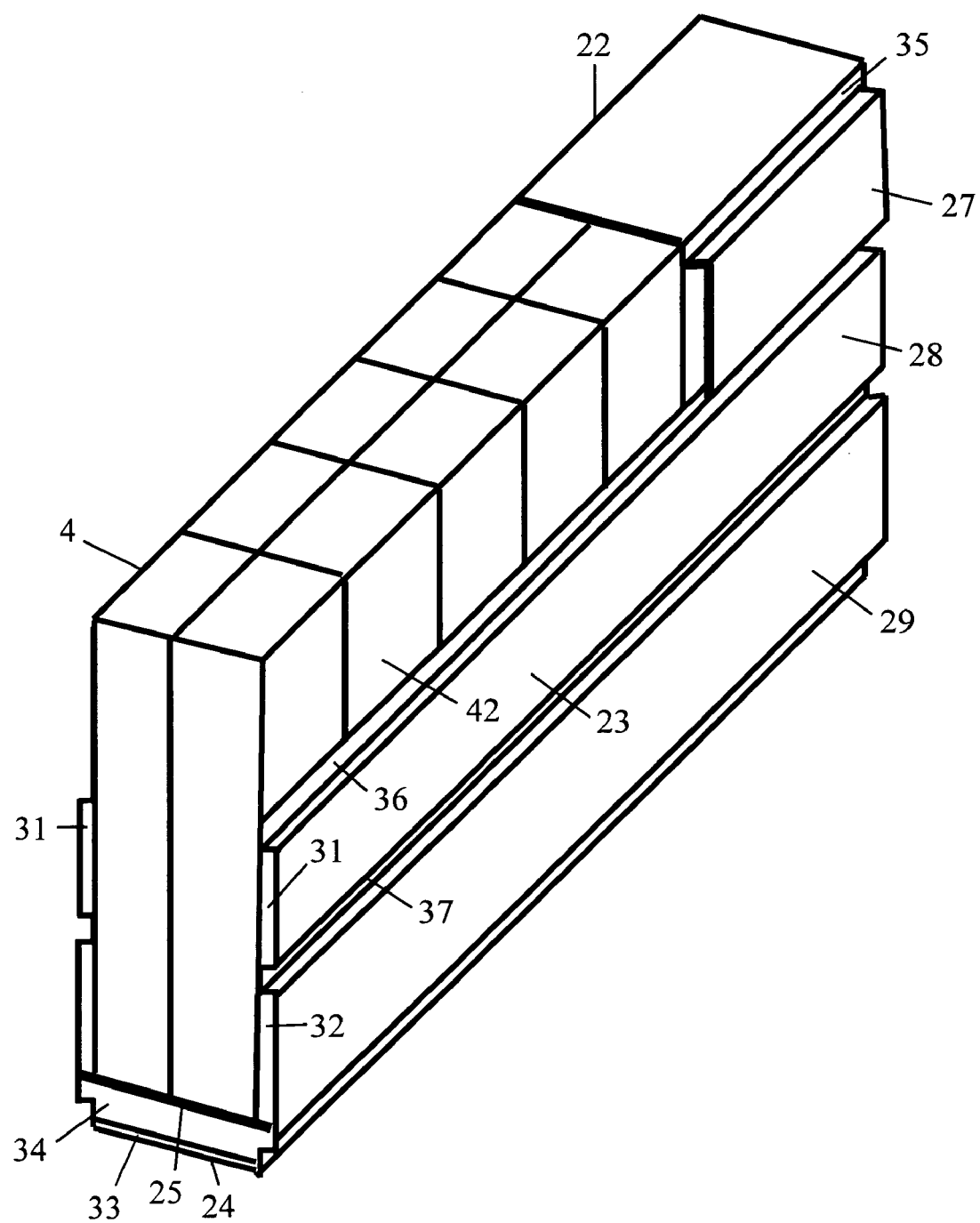
FIG. 3 illustrates a partial cut-away frontal view of a RSM with a top cover removed containing a plurality of disk drives in accordance with the preferred embodiment of the present invention.
Figure 4:
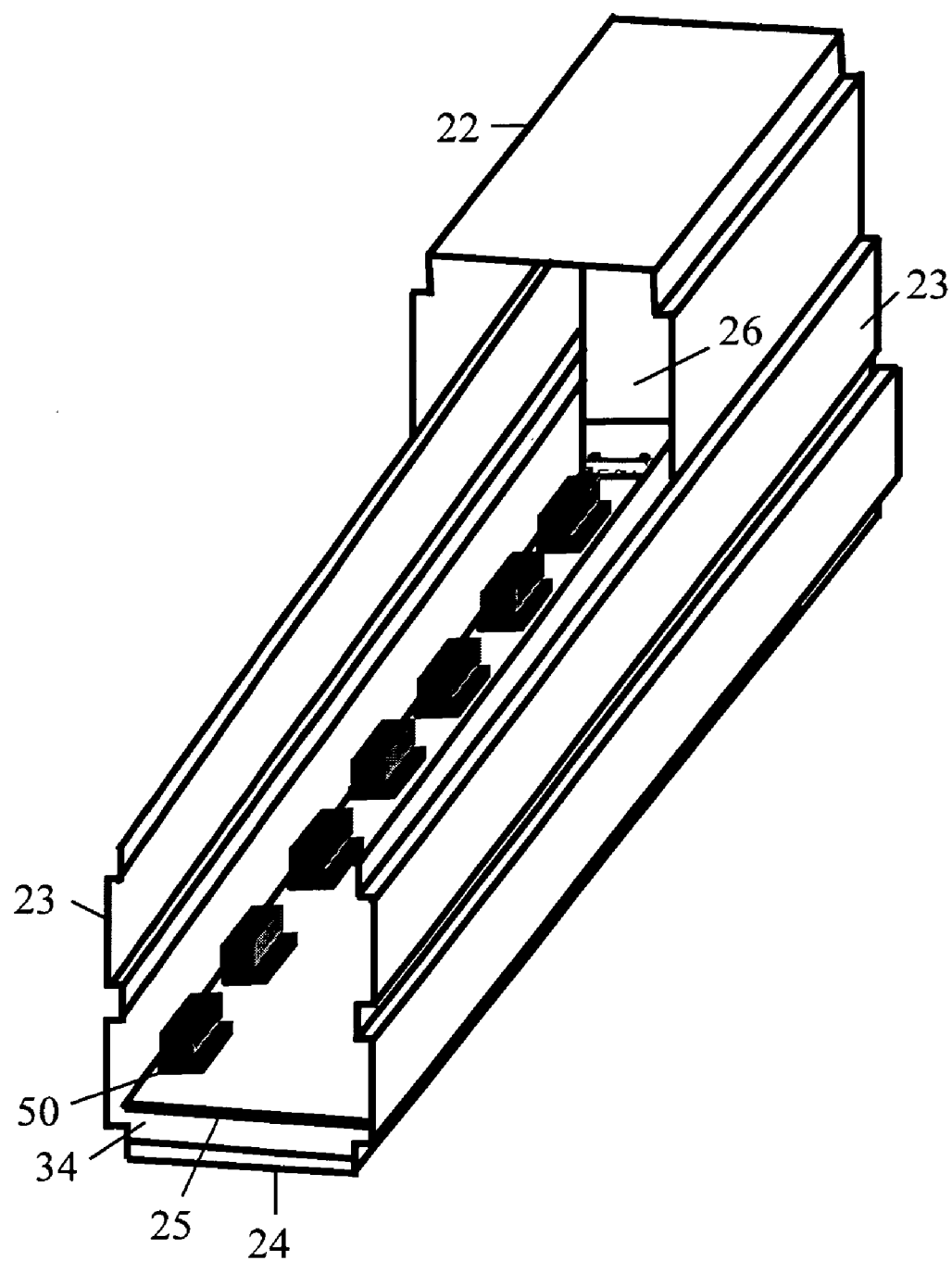
FIG. 4 illustrates a partial cut-away frontal view of a RSM with a top cover removed in accordance with the preferred embodiment of the present invention.

FIGS. 2–4 illustrates RSM 3 without the handle 13. As illustrated in FIGS. 2 and 3, RSM 3 preferably holds two rows 41 of disk drives 4 mounted side by side on board 25. There may be any number of disk drives 4 within a row 41. In the preferred embodiment, seven disk drives 4 may be contained in each row 41, thereby providing fourteen disk drives 4 within RSM 3.

RSM 3 preferably contains top cover plates 21 and 22, which may be removable. FIG. 2 illustrate RSM 3 with top cover plates 21 and 22 attached, and FIGS. 3 and 4 illustrate RSM 3 with top cover plate 21 removed. Although top cover plates 21 and 22 are illustrated as separate units, they may be integrally formed as one unit. RSM 3 may also preferably contain side plates 23 and bottom plate 24. Side plate 23 may be integrally formed with bottom plate 24 as a single unit, as shown in FIGS. 2–4, or may be separate plates from bottom plate 24. In the preferred embodiment, handle 13 may be attached to RSM 3 with a front plate (not shown), which may be removable.

As shown in FIGS. 2–4, top plates 21 and 22 may overlap ends of side plate 23. In the preferred embodiment, top plates 21 and 22, side plates 23 and bottom plate 24 mate together to cover and protect side, top and bottom surfaces of disk drives 4. In the preferred embodiment, the front plate (not shown) may also mate with any one of or all of top plate 21, side plates 23 and bottom plate 24 to cover and protect the front surface of disk drive 4. As shown in FIG. 4, RSM 3 preferably contains a back plate 26 which may mate with any one of or all of top plate 22, side plates 23 and bottom plate 24 to cover and protect end surfaces of disk drives 4.

As illustrated in FIGS. 2–4, in the preferred embodiment, top plates 21 and 22 contain a flat portion 35 which abuts or nearly abuts against side and top surfaces of disk drives 4. Top plates 21 and 22 preferably contain a raised portion 27 which is spaced away from side surfaces of disk drives 4 to form a gap 30. Top plates 21 and 21 preferably mate with side plates 23 by overlapping flat portion 36 (see FIG. 3) of side portions 23 with raised portion 27. Flat portions 36 and 35 of side plates 23 abut or nearly abut against side and top surfaces of disk drives 4. Preferably, side plates 23 contain raised portions 28 and 29 which are spaced away from side surfaces of disk drives 4 to form gaps 31 and 32, respectively.

Gaps 30, 31 and 32 are preferably sufficiently sized to allow adequate airflow for cooling disk drives 4. In the preferred embodiment, the optimum size of gaps 30, 31 and 32 may be empirically determined based on the heat generated by a typical disk drive 4 and the form factor of a typical disk drive 4. The optimum size of gaps 30, 31 and 32 is preferably, the minimum size that provides sufficient air flow to satisfy the cooling requirements of the disk drives 4. In the preferred embodiment, top plates 21 and 22, side plates 23 and/or bottom plate 24 are made of thermally conductive material to further allow cooling of disk drives 4. For example, in a construction containing 14 disk drives and using aluminum of 0.063 inches thick for plates 21, 22, 23 and 24, the gaps 30, 31, and 32 may be about 0.216 inches wide. Also, as illustrated in FIGS. 2 and 3, a gap 40 may be located between the two rows of disk drives 4.

As illustrated in FIGS. 2–4, bottom plate 24 preferably contains a raised portion 33 which extends out from a flat portion 38 of bottom plate 24 to form gap 34. Gap 34 is preferably large enough to provide sufficient space for a digital controller (not shown) to provide control logic functions to disk drives 4 that may be attached to board 25, as well as sufficient space for providing power and control interconnections to the plurality of disk drives 4 contained in RSM 3. Flat portions 38 may serve to support board 25 in the preferred embodiment.

Figure 5:
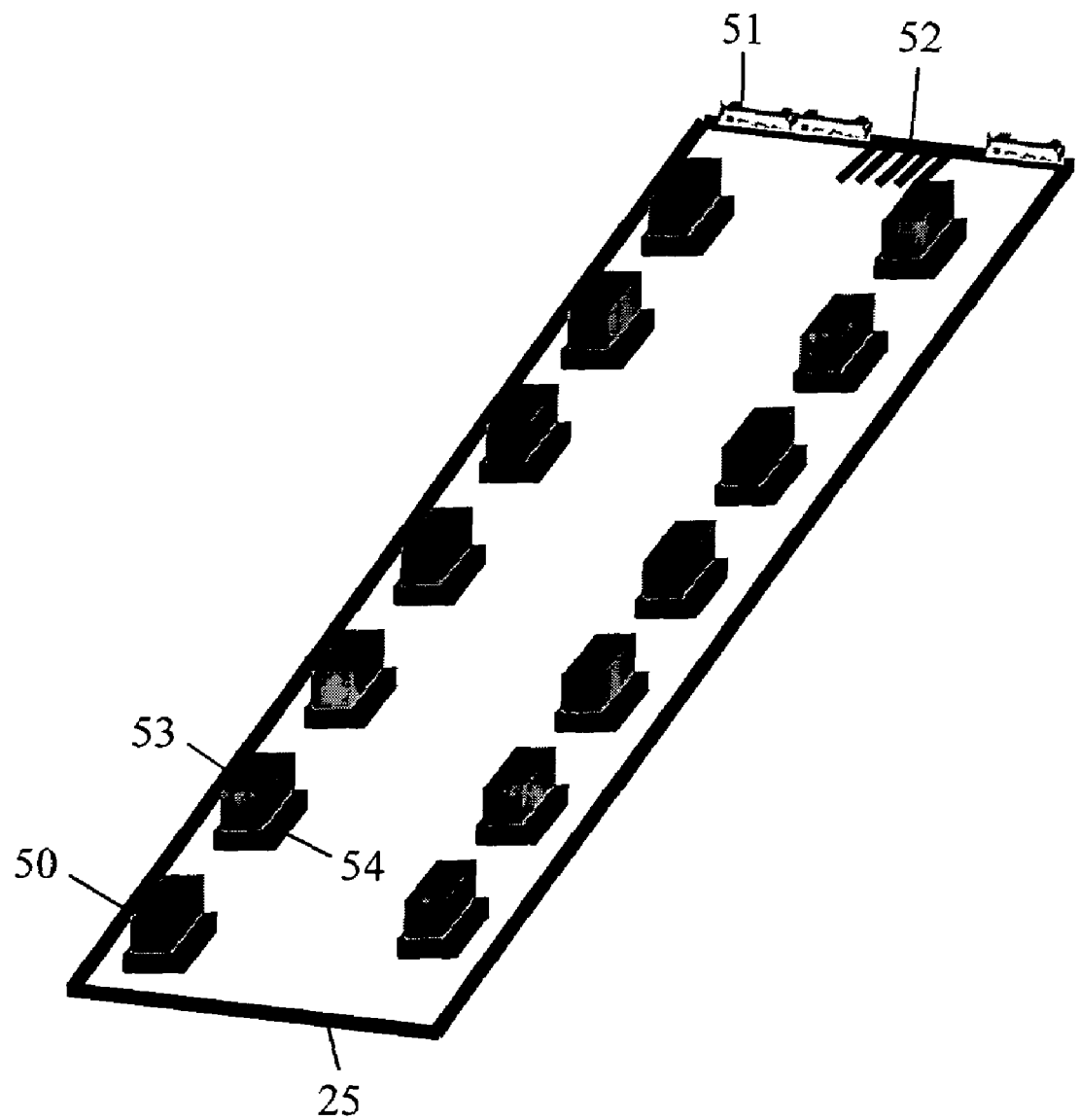
FIG. 5 illustrates a board for mounting disk drives in accordance with the preferred embodiment of the present invention.

The upper surface of board 25 is illustrated in FIGS. 4 and 5. FIG. 4 illustrates RSM 3 without disk drives 4 and FIG. 5 illustrates board 25 removed from RSM 3. In the preferred embodiment, board 25 may be a PCB board. As illustrated in FIGS. 4 and 5, board 25 contains a plurality of ports 50. Each port 50 may preferably connect to an individual disk drive 4 as a plug-in connection through which electricity, control logic and data may be provided to or from disk drive 4. In the preferred embodiment, each RSM 3 may contain a controller (not shown) on the bottom of board 25 which in connected to each disk drive 4 through ports 50. The controller may preferably control the control logic functions of each drive and the READ and WRITE functions of each drive through port 50.

As illustrated in FIGS. 4 and 5, board 25 preferably contains a latching mechanism 51 which is preferably configured to engage a suitable latching mechanism (not shown) in docking port 9 (see FIG. 1) of cabinet 1 when RSM 3 is slid into bay 16. Board 25 preferably contains an electrical connector 52 which is preferably configured to engage a suitable electrical connector (not shown) in docking port 9 (see FIG. 1) of cabinet 1 when RSM 3 is slid into bay 16. In the preferred embodiment, electrical connector 52 is a plug-in connector that allows electricity, control logic information and READ/WRITE data to be transferred between RSM 3 and docking port 9.

As illustrated in FIGS. 3–5, in the preferred embodiment, disk drives 4 are mounted side by side in two rows 41. Preferably, disk drives 4 are mounted with their power and control connectors (not shown) facing downward to engage plug 50. Plug 50 preferably contains an engaging portion 53 which engages power and control connectors (not shown) of disk drives 4, and a shoulder portion 54 upon which disk drives 4 may rest. As shown in FIG. 3, disk drives 4 are further preferably mounted such that the lateral surface 42 of disk drive 4 faces outward for each row 41.

The arrangement of the present invention enables maximizing the number of disk drives that can be effectively used in a rack or cabinet configuration. The technique of the present invention is extendable in both vertical and horizontal directions to optimize packing density of disk drives at a higher volume level. The present invention allows a user to save floor space while obtaining a high volume storage system. The present invention eliminates the need for a technician to individually connect or wire each disk drive and also enables easy and convenient serviceability of the disk drives 4. The present invention allows replacement of individual failed disk drives without disturbing the other disk drives in the storage system or the RSM and hence, without impacting the security of the majority of the data contained in the storage system.

Although the present invention is illustrates a single column of RSMs 3 in cabinet 1, cabinet 1 may contain a plurality of columns in which a plurality of RSMs 3 are held on the same elevation or row. Furthermore, an RSM 3 may be oriented in cabinet 1 in any direction, such as vertical, as shown in FIG. 1, or in a flat or horizontal manner (not shown). The horizontal orientation may be used with a cabinet having a plurality of columns, forming rows of RSMs 3. The RSM may also be configured to slide sideways in cabinet 1 with a longitudinal side, top side or a bottom side of RSM 3 entering cabinet 1 first.

The foregoing description of the invention is intended to only illustrate exemplary embodiments of the invention. Those of skill in the art will appreciate that there are many minor alterations to the disclosed exemplary embodiments within spirit and scope of the invention. For example, although the present invention has been described in connection with disk drives, those of skill in the art will appreciate that the present invention may be suitable for any type of storage device, including optical disc drives, such as CD-ROM drives, CDRW drives, DVD drives and writeable DVD drives, as well as tape drives. Also for example, although the a typical disk drive fits in a 3½ inch form *factor*, the present invention is not limited to any particular form factor of disk drives and disk drives with other form factors may be *used*. F*urthermore*, one or more fans may be used with cabinet 1 to provide additional airflow throughout the cabinet to cool the storage *devices*.

We claim:

1. A storage device comprising:
   a cabinet capable of holding a plurality of modules capable of containing a plurality of storage devices, said cabinet having a docking port being configured to electrically connect to said modules;
   each module of said plurality of modules including: a board having a plurality of ports, each port of said plurality of ports being capable of electrically coupling to a storage device, and said plurality of ports being arranged in two rows, one row of ports along each of two lengthwise edges of the board and one row of ports being staggered with respect to the other row of ports so that ports of one row are not transversely aligned with ports of the other row, wherein a coupling direction of the ports is outward from the board so that a plurality of storage devices when coupled to the ports are arranged in rows with component sides of the storage devices facing away from each other and with non-component sides of the storage devices facing each other.

2. The storage device of claim 1, wherein each module further includes a side housing member having raised portions and lowered portions, said raised portions providing a channel to allow airflow through said module.

3. The storage device of claim 2, wherein each module further includes a top housing member having lateral raised portions and lateral lowered portions, said lateral raised portions providing a channel to allow airflow through said module.

4. The storage device of claim 3, wherein said top housing member includes a plurality of individually removable segments.

5. The storage device of claim 2, wherein each module further includes a bottom housing portion having raised bottom portions and lowered bottom portions, said raised bottom portions providing a channel to allow placement of interconnections to said plurality of ports.

6. The storage device of claim 5, wherein lowered bottom portions provide mechanical support to said board.

7. The storage device of claim 1, wherein said board further includes an electrical connector capable of electrically coupling said module to said docking port in said cabinet.

8. The storage device of claim 7, wherein said board further includes a latching mechanism capable of mechanically connecting said module to said docking port in said cabinet.

9. The storage device of claim 8, wherein each module of said plurality of modules is configured to be electrically disconnected and mechanically removed from a docking port within said cabinet by a single operation, and to allow a single disk drive of said plurality of disk drives to be removed without disturbing a connection of other disk drives connected to the board of the module.

10. A storage apparatus comprising:
    a board having a plurality of ports, each port of said plurality of ports being capable of electrically coupling to a storage device, and said plurality of ports being arranged in two rows, one row of ports along each of two lengthwise edges of the board and one row of ports being staggered with respect to the other row of ports so that ports of one row are not transversely aligned with ports of the other row, wherein a coupling direction of the ports is outward from the board so that a plurality of storage devices when coupled to the ports are arranged in rows with component sides of the storage devices facing away from each other and with non-component sides of the storage devices facing each other; and
    a housing holding said board and configured to hold a plurality of devices in rows with a lateral surface of said storage devices facing parallel to a lateral edge of said board when said plurality of devices are coupled to said board.

11. The storage apparatus of claim 10, wherein said housing further includes a side housing member having raised portions and lowered portions, said raised portions providing a channel to allow airflow through said module.

12. The storage apparatus of claim 11, wherein said housing further includes a top housing member having lateral raised portions and lateral lowered portions, said lateral raised portions providing a channel to allow airflow through said module.

13. The storage apparatus of claim 12, wherein said top housing member includes a plurality of individually removable segments.

14. The storage apparatus of claim 11, wherein said housing further includes a bottom housing portion having raised bottom portions and lowered bottom portions, said raised bottom portions providing a channel to allow placement of interconnections to said plurality of ports.

15. The storage apparatus of claim 14, wherein lowered bottom portions provide mechanical support to said board.

16. The storage apparatus of claim 10, wherein said board further includes an electrical connector capable of receiving a signal.

17. The storage apparatus of claim 16, further comprising:
    a latching mechanism.

18. The storage apparatus of claim 17, wherein the storage apparatus is configured to be electrically disconnected and mechanically removed from a docking port within said cabinet by a single operation, and to allow a single disk drive of said plurality of disk drives to be removed without disturbing a connection of other disk drives coupled to the board.

19. The storage apparatus of claim 10, wherein said housing is made of thermally conductive material.

20. A method of packaging storage devices having a control connector on an end surface at an edge of each storage device, wherein each storage device also has a component side on a surface adjacent to the control connector and parallel with a direction of coupling of the end connector, wherein each storage device also has a non-component side on a surface facing opposite to the component side, the method comprising the steps of:

A) orienting a first storage device so that an end having a first storage device control connector faces a board and a lateral surface of the first storage device is parallel to a first lateral edge of said board and said board has a plurality of ports arranged in rows, each port of said plurality of ports being capable of electrically connecting to a control connector and one row of ports being staggered with respect to the another row of ports so that ports of one row are not transversely aligned with ports of the other row;

B) pushing the first storage device on to said board so that the first storage device control connector becomes electrically connected to a first port on said board;

C) orienting a second storage device so that an end having a second storage device control connector faces the board and the non-component side of the first storage device is adjacent to the non-component side of the second storage device and a lateral surface of the second storage device is parallel to a second lateral edge of said board, and an opposite lateral surface of the second storage device is parallel to another lateral surface of said first storage device, said second lateral edge of said board being opposite to the first lateral edge of said board; and D) pushing the second storage device on to said board so that the second storage device control connector becomes electrically connected to a second port on said board.

21. The method of packaging storage devices according to claim 20, further comprising the step of:
repeating steps A through D until all of the plurality of ports are attached to a storage device.

22. The method of packaging storage devices according to claim 20, further comprising the step of:
covering said board, said first storage device and said second storage device with a housing, said housing having side housing member having raised portions and lowered portions, said raised portions providing a channel to allow airflow through said module.

23. The method of packaging storage devices according to claim 22, wherein said housing further includes a bottom housing portion having raised bottom portions and lowered bottom portions, said raised bottom portions providing a channel to allow placement of interconnections to said plurality of ports.

24. The method of packaging storage devices according to claim 22, wherein said board further includes an electrical connector, the method further comprising the step of inserting said housing in a cabinet suited for holding a plurality of housings having a plurality of storage devices and electrically connecting the electrical connector to a docking port in the cabinet.

25. The method of packaging storage devices according to claim 24, wherein said board further includes a latching mechanism.

26. The method of packaging storage devices according to claim 25, wherein the steps of latching the latching mechanism and electrically connecting the electrical connector occur by the same action of an operator.

27. The method of packaging storage devices according to claim 25, further comprising the steps of unlatching the latching mechanism and disconnecting the electrical connector occur by the same action of an operator.

28. The method of packaging storage devices according to claim 20, wherein the action of pushing the first storage device in step B electrically connects and mechanically connects the first storage device to the board in a single operation.

29. The method of packaging storage devices according to claim 28, wherein the action of pushing the second storage device in step D electrically connects and mechanically connects the second storage device to the board in a single operation.

30. The storage device of claim 1 wherein each row of ports is longitudinally aligned and ports in each row are equally spaced from each other.

31. The storage device of claim 30 wherein each of said ports comprises a shoulder.

32. The storage apparatus of claim 10 wherein each row of ports is longitudinally aligned and ports in each row are equally spaced from each other.

33. The storage apparatus of claim 32 wherein each of said ports comprises a shoulder.

* * * * *